US010226124B2

(12) United States Patent
Ahn et al.

(10) Patent No.: US 10,226,124 B2
(45) Date of Patent: Mar. 12, 2019

(54) DISPLAY APPARATUS AND WALL MOUNTING DEVICE FOR DISPLAY APPARATUS

(71) Applicant: SAMSUNG ELECTRONICS CO., LTD., Suwon-si (KR)

(72) Inventors: Joon Seok Ahn, Suwon-si (KR); Hee-Bong Kim, Gimpo-si (KR); Jun-Mo Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 15/094,388

(22) Filed: Apr. 8, 2016

(65) Prior Publication Data
US 2016/0296018 A1 Oct. 13, 2016

(30) Foreign Application Priority Data

Apr. 8, 2015 (KR) .................. 10-2015-0049398

(51) Int. Cl.
F16M 11/08 (2006.01)
A47B 97/00 (2006.01)
(Continued)

(52) U.S. Cl.
CPC ......... A47B 97/001 (2013.01); F16M 11/041 (2013.01); F16M 11/08 (2013.01);
(Continued)

(58) Field of Classification Search
CPC . F16M 11/2014; F16M 11/08; Y10S 248/917; Y10S 248/922
See application file for complete search history.

(56) References Cited

U.S. PATENT DOCUMENTS 5,918,845 A 7/1999 Whitaker
7,000,878 B2 * 2/2006 Lin .................. F16M 11/08
248/276.1
(Continued)

FOREIGN PATENT DOCUMENTS

CN 1741197 A 3/2006
CN 201066892 Y 5/2008
(Continued)

OTHER PUBLICATIONS

Communication dated Aug. 17, 2016, issued by the European Patent Office in counterpart European Patent Application No. 16163160.1.
(Continued)

Primary Examiner — Bradley Duckworth
(74) Attorney, Agent, or Firm — Sughrue Mion, PLLC

(57) ABSTRACT

There is provided a wall mounting device for mounting a display apparatus on a wall, the wall mounting device including: a display apparatus coupling unit coupled with a central portion of the display apparatus along a first direction and including a plurality of locking parts arranged in a second direction, the second direction being substantially perpendicular to the first direction; and a wall coupling unit configured to be coupled with the wall and including a plurality of supporting sections arranged along the second direction configured to support the plurality of locking parts.

18 Claims, 15 Drawing Sheets

(51) Int. Cl.
*F16M 11/04* (2006.01)
*F16M 13/02* (2006.01)
*H04N 5/655* (2006.01)

(52) U.S. Cl.
CPC ............ *F16M 13/02* (2013.01); *H04N 5/655* (2013.01); *A47B 2097/003* (2013.01); *A47B 2097/005* (2013.01); *F16M 2200/04* (2013.01)

(56) References Cited

U.S. PATENT DOCUMENTS

| | | | | |
|---|---|---|---|---|
| 7,066,435 | B2* | 6/2006 | Oddsen, Jr. | F16M 11/10 248/220.31 |
| 7,464,909 | B2* | 12/2008 | Li | F16M 11/08 248/274.1 |
| 7,673,837 | B2* | 3/2010 | Park | F16M 11/045 248/201 |
| 7,857,270 | B2* | 12/2010 | Short | F16M 11/10 248/284.1 |
| 7,866,621 | B1* | 1/2011 | Walters | F16M 11/08 248/421 |
| 8,079,311 | B2* | 12/2011 | Whalen | F16M 11/00 108/42 |
| 8,087,192 | B2* | 1/2012 | Allen | F16M 11/10 248/284.1 |
| 8,264,822 | B2* | 9/2012 | Sakamoto | F16M 11/08 165/104.13 |
| 8,276,867 | B2* | 10/2012 | Hung | F16M 11/08 248/274.1 |
| 8,561,955 | B2* | 10/2013 | Stemple | F16M 11/04 248/276.1 |
| 8,628,051 | B2* | 1/2014 | Huang | F16M 11/10 248/276.1 |
| 8,777,172 | B2* | 7/2014 | Sapper | F16M 11/08 248/274.1 |
| 9,033,292 | B2* | 5/2015 | Lu | F16M 13/022 248/123.11 |
| 9,121,543 | B2* | 9/2015 | Dittmer | F16M 11/10 |
| 9,423,066 | B2* | 8/2016 | Wang | F16M 11/2014 |
| 2005/0189460 | A1* | 9/2005 | Oddsen, Jr. | F16M 11/2014 248/314 |
| 2007/0102608 | A1 | 5/2007 | Park | |
| 2007/0246627 | A1* | 10/2007 | Morita | F16M 11/08 248/289.11 |
| 2008/0011924 | A1* | 1/2008 | Li | F16M 11/10 248/309.1 |
| 2008/0029669 | A1* | 2/2008 | Olah | B60R 11/0229 248/276.1 |
| 2011/0108688 | A1* | 5/2011 | Parruck | F16M 11/045 248/217.4 |
| 2012/0187264 | A1 | 7/2012 | Vlies | |
| 2014/0063771 | A1* | 3/2014 | Bando | G06F 1/181 361/809 |
| 2014/0104503 | A1* | 4/2014 | Takao | F16M 11/08 348/836 |
| 2014/0265775 | A1* | 9/2014 | Grziwok | F16M 11/08 312/246 |
| 2014/0367137 | A1* | 12/2014 | Leung | H02G 3/045 174/68.3 |

FOREIGN PATENT DOCUMENTS

| | | |
|---|---|---|
| CN | 101487560 A | 7/2009 |
| CN | 201555005 U | 8/2010 |
| CN | 101832457 A | 9/2010 |
| CN | 203375134 U | 1/2014 |
| EP | 1848210 A2 | 10/2007 |
| GB | 2450892 A | 1/2009 |
| JP | 2010-276727 A | 12/2010 |
| KR | 10-2013-0078565 A | 7/2013 |
| KR | 10-2013-0088220 A | 8/2013 |
| KR | 10-1319543 B1 | 10/2013 |

OTHER PUBLICATIONS

International Search Report (PCT/ISA/210) dated Sep. 26, 2016, issued by the International Searching Authority in counterpart International Patent Application No. PCT/KR2016/003635.
Communication dated Nov. 27, 2017, from the State Intellectual Property Office of People's Republic of China in counterpart Application No. 201610217582.8.
Communication dated Jun. 26, 2018, issued by the State Intellectual Property Office of the People'e Republic of China in counterpart Chinese Application No. 201610217582.8.
Communication dated Sep. 27, 2018 issued by the European Patent Office in counterpart European Application No. 16 163 160.1.
Communication dated Dec. 4, 2018 issued by the State Intellectual Property Office of P.R. China in counterpart Chinese Application No. 201610217582.8.

* cited by examiner

DISPLAY APPARATUS AND WALL MOUNTING DEVICE FOR DISPLAY APPARATUS

CROSS-REFERENCE TO RELATED APPLICATION

This application claims priority from Korean Patent Application No. 10-2015-0049398, filed on Apr. 8, 2015 in the Korean Intellectual Property Office, the disclosure of which is incorporated herein by reference in its entirety.

BACKGROUND

1. Field

Apparatuses consistent with exemplary embodiments relate to a display apparatus and a wall mounting device for installing the display apparatus on a wall.

2. Description of the Related Art

Display apparatuses are types of output apparatuses which visually display data information such as text, figures, etc. and images and the display apparatuses include televisions (TV) and various monitors. Particularly, display apparatuses such as liquid crystal panels or plasma display panels (PDPs) may be installed on a wall by having a small thickness.

Wall mounting devices for mounting display apparatuses may be provided according to a standard of the Video Electronics Standards Association (VESA). According to the standard of the VESA, four holes where locations of the four holes approximately forming a rectangle are formed on a rear surface of a display apparatus and a wall mounting device has a structure for attaching the display apparatus through the four holes on the rear surface.

Wall mounting devices having the structure described above basically have supporting points in places at a predetermined interval from a centerline extending in a vertical direction of a display apparatus toward each of a left side and a right side of the centerline. Accordingly, when being used for curved display apparatuses, there is a limitation to reducing the thicknesses of wall mounting devices. Also, it is difficult to support the swiveling of display apparatuses.

SUMMARY

Therefore, one or more exemplary embodiments provide a wall mounting device which has a smaller thickness compared with general types.

One or more exemplary embodiments provide a wall mounting device which enables the swiveling of a display apparatus.

One or more exemplary embodiments provide a wall mounting device able to guide a wire which connects a display apparatus with an external component.

One or more exemplary embodiments provide a display apparatus in which the wall mounting device is installable.

In accordance with an aspect of an exemplary embodiment, there is provided a wall mounting device for mounting a display apparatus on a wall, the wall mounting device including: a display apparatus coupling unit coupled with a central portion of the display apparatus along a first direction and including a plurality of locking parts arranged in a second direction, the second direction being substantially perpendicular to the first direction; and a wall coupling unit coupled with the wall and including a plurality of supporting sections arranged along the second direction to support the plurality of locking parts.

The display apparatus coupling unit may be configured to rotate in a clockwise direction and a counter-clockwise direction relative to the wall coupling unit.

The display apparatus coupling unit may be coupled with a lower portion of the display apparatus along the second direction.

The display apparatus coupling unit and the wall coupling unit may be detachably coupled to each other.

Each of the plurality of supporting sections may include a rotating pin protruding in the second direction, the display apparatus configured to rotate with respect to the rotating pin, and each of the plurality of locking parts may include a pin accommodating section into which the rotating pin is rotatably accommodated.

Each of the plurality of locking parts may include a rotating pin protruding in a second direction, the display apparatus configured to rotate with respect to the rotating pin, and each of the plurality of supporting sections may include a pin accommodating section into which the rotating pin is rotatably accommodated.

The wall mounting device may further include a bearing member configured to support an axial load between the display apparatus coupling unit and the wall coupling unit.

The bearing member may include: an upper bearing member coupled with a locking part of the plurality of locking parts; and a lower bearing member coupled with a supporting section of the plurality of supporting sections.

The wall mounting device may further include a wire guide section configured to guide a wire to be connected to the display apparatus.

In accordance with an aspect of an exemplary embodiment, there is provided a wall mounting device for mounting a display apparatus on a wall, the wall mounting device including: a display apparatus coupling unit coupled with a rear surface of the display apparatus; and a wall coupling unit coupled with the wall and configured to support the display apparatus coupling unit, wherein at least one of the display apparatus coupling unit and the wall coupling unit may include a wire guide section configured to guide a wire to be connected to the display apparatus.

The wire guide section may include a wire through hole formed in the display apparatus coupling unit.

The wire guide section may include a wire through hole formed in the wall coupling unit.

The wire guide section may include a wire path formed between the display apparatus coupling unit and the wall coupling unit.

In accordance with an aspect of an exemplary embodiment, there is provided a wall mounting device for mounting a display apparatus on a wall, the wall mounting device including: a first unit coupled at a central portion of the display apparatus with respect to a first direction and including: a body having an elongated shape in a second direction substantially perpendicular to the first direction; and a plurality of locking parts provided on the body and arranged in the second direction; and a second unit coupled with the wall and including: a base section having an elongated shape corresponding to the body; and a plurality of supporting sections provided on the base section and arranged in the second direction to support the plurality of locking parts.

The first unit further may include a wing part protruding from the body, the wing part configured to balance the load of the display apparatus supported by the body.

The body and the plurality of locking parts may be integrally formed.

The body and the plurality of locking parts may be attached to each other using a fastening member.

The base section and the plurality of supporting sections may be integrally formed.

The base section and the plurality of supporting sections may be attached to each other using a fastening member.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

Figure 1:
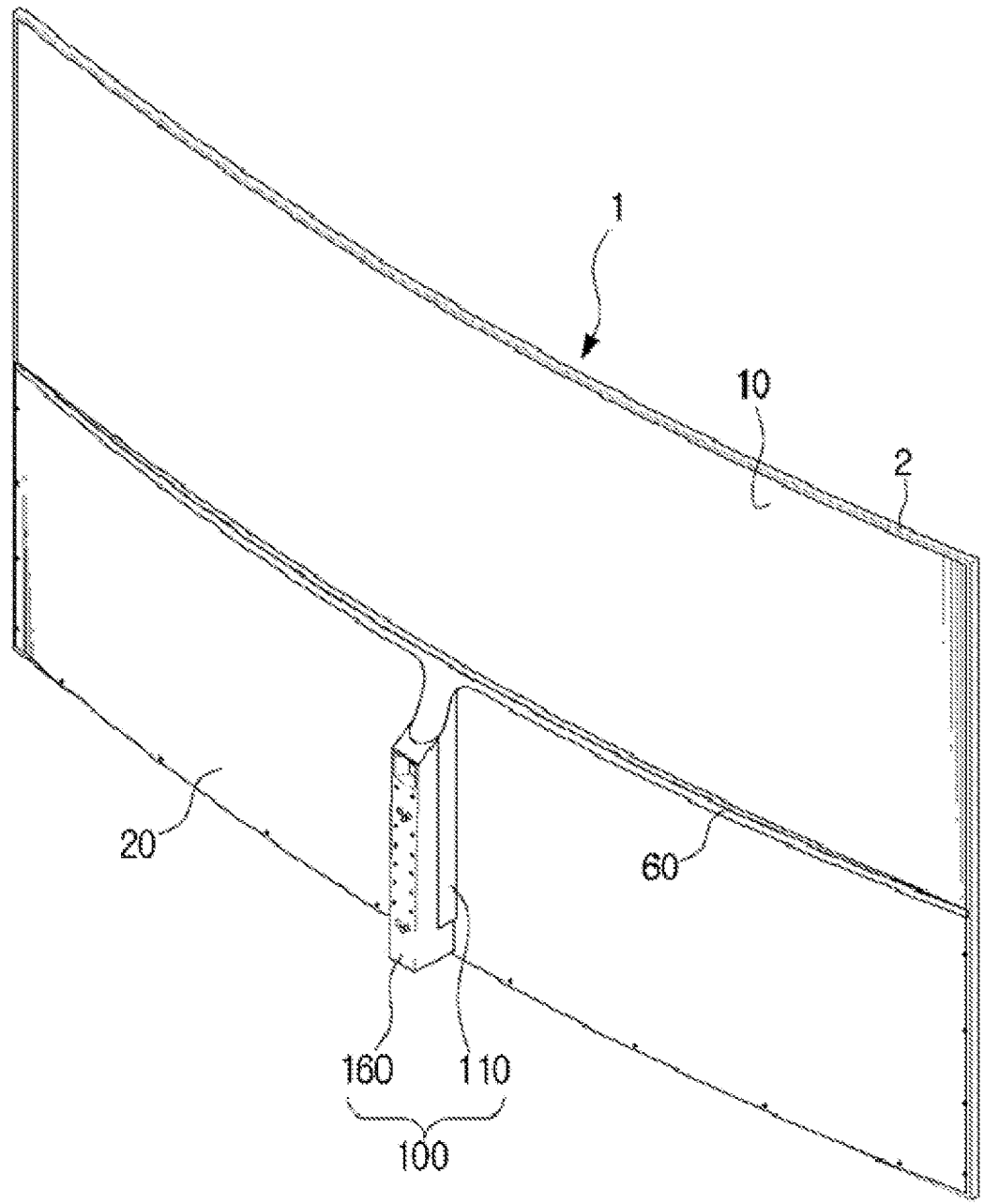
FIG. 1 is a rear perspective view of a display apparatus and a wall mounting device according to an exemplary embodiment.

Reference will now be made in detail to the exemplary embodiments, examples of which are illustrated in the accompanying drawings, wherein like reference numerals refer to like elements throughout.

Hereinafter, exemplary embodiments will be described in detail.

FIG. 1 is a rear perspective view of a display apparatus 1 and a wall mounting device 100 according to an exemplary embodiment.

The display apparatus 1 may be one of a television (TV) and various monitors. In the exemplary embodiment, the display apparatus 1 has a curved shape but is not limited thereto. The inventive concept of the disclosure may be applied to flat or bendable display apparatuses as well as the curved display apparatus.

The display apparatus 1 may be one of a light-emitting type such as an organic light emitting diode (OLED) display using a display panel which autonomously emits light and a light-receiving type such as a liquid crystal display (LCD) using a display panel which does not autonomously emit light and receives light from a backlight unit but is not limited thereto.

The backlight unit may include a light source such as a cold cathode fluorescent lamp (CCFL), an external electrode fluorescent lamp (EEFL), and a light emitting diode (LED) and various subsidiary optical materials. The backlight unit may be one of a direct type in which a light source is disposed in the rear of a display panel and an edge type in which a light source is disposed on the side of a display panel.

Subsidiary optical materials may include a light guide plate (LGP) which converts light emitted by a light source of an edge type backlight unit into a surface light source and various optical sheets.

The display apparatus 1 may include a chassis assembly which supports internal components. The chassis assembly may include a top cover at the front, a bottom chassis 10 at the rear, a rear cover 20 disposed to the rear of the bottom chassis 10, and a side frame 2. When the display apparatus 1 has a curved shape, the bottom chassis 10 may also have a curved shape. The rear cover 20 may be provided on a lower portion of the bottom chassis 10, and an upper portion of the bottom chassis 10 may be exposed to the outside as shown in FIG. 1. The upper part of the display apparatus 1 may have a slimmer shape than the lower part.

A wall mounting device 100 for mounting the display apparatus 1 on a wall may be fixedly coupled with a rear surface of the display apparatus 1. That is, the wall mounting device 100 may be coupled with the display apparatus 1 using additional fastening members such as screws or bolts.

The wall mounting device 100 may be coupled with a central portion of the display apparatus 1 along a lateral direction of the display device 1 (e.g., the central portion between the left side of the display apparatus 1 and the right side of the display apparatus 1). Thereby, a load of the display apparatus 1 may not be unevenly applied along the lateral direction of the display apparatus 1 and the display apparatus 1 may be supported to be balanced.

The wall mounting device 100 may be coupled with the lower portion of the display apparatus 1. That is, the wall mounting device 100 may be coupled with the rear cover 20. Thereby, the display apparatus 1 may be more stably supported.

The wall mounting device 100 may include a display apparatus coupling unit 110 fixedly coupled with the display apparatus 1 and a wall coupling unit 160 which is fixedly coupled with the wall and supports the display apparatus coupling unit 110.

The display apparatus coupling unit 110 is fixedly coupled with the rear surface of the display apparatus 1 and the wall coupling unit 160 is fixedly coupled with the wall, and then, the display apparatus coupling unit 110 is coupled to the wall coupling unit 160, thereby mounting the display apparatus 1 on the wall.

The display apparatus 1 may include a decoration cover member 60 on the rear surface of the display apparatus 1.

Figure 2:
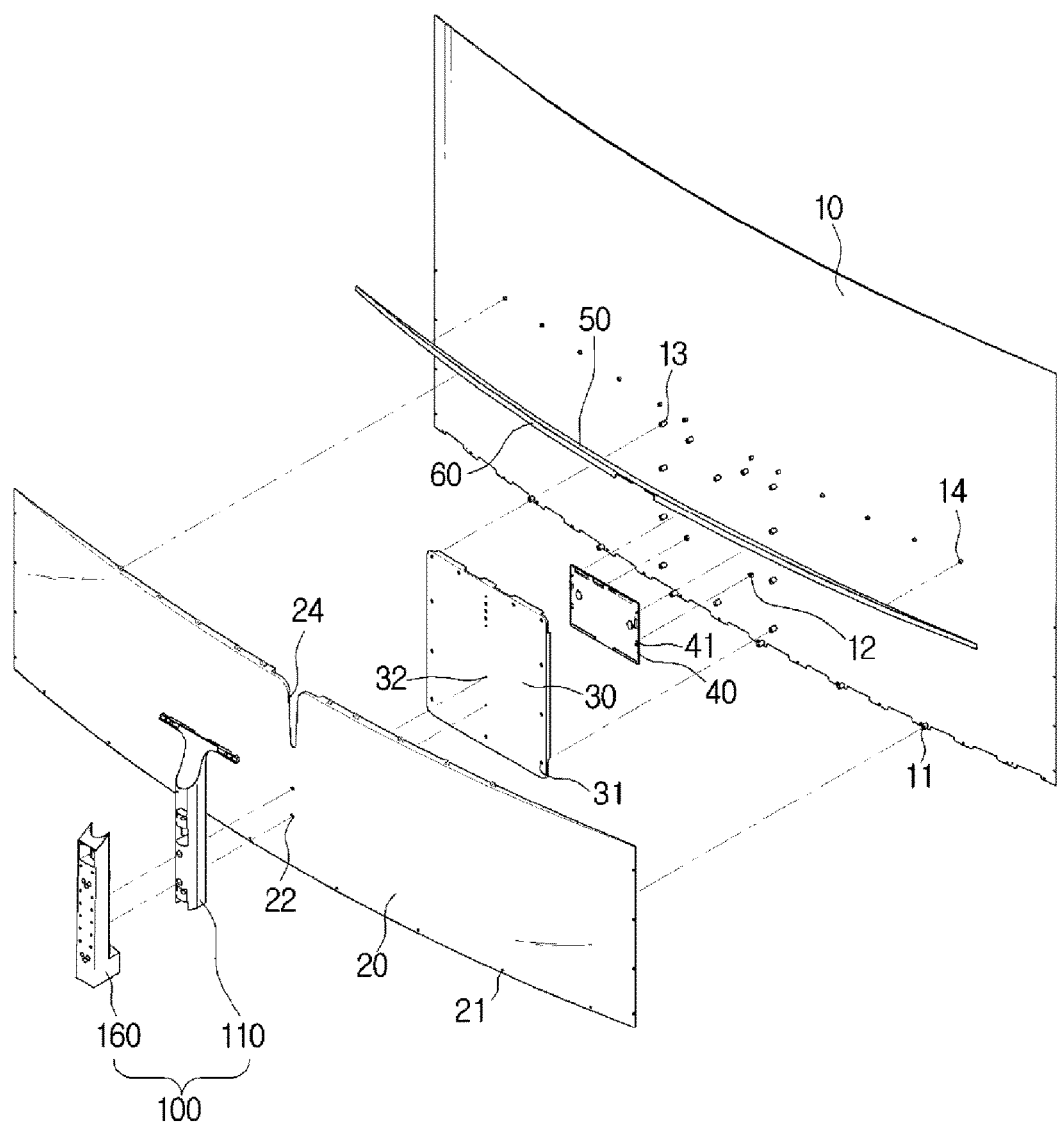
FIG. 2 is an exploded view illustrating main components of the display apparatus and the wall mounting device according to an exemplary embodiment.

FIG. 2 is an exploded view illustrating main components of the display apparatus 1 and the wall mounting device 100 according to an exemplary embodiment.

The display apparatus 1 may include the bottom chassis 10, the rear cover 20 provided at a rear lower portion of the bottom chassis 10, a circuit board 40 which is provided between the bottom chassis 10 and the rear cover 20 and transmits an electric signal, a reinforcing plate 30 which is provided between the bottom chassis 10 and the rear cover 20 and reinforces a coupling force between the wall mounting device 100 and the display apparatus 1, and a decoration member 50.

The rear cover 20, the circuit board 40, the reinforcing plate 30, and the decoration member 50 may be fixedly coupled with the bottom chassis 10. For this, the bottom chassis 10 may include a fastening hole 11 for coupling with the rear cover 20, a fastening hole 12 for coupling with the circuit board 40, a fastening hole 13 for coupling with the reinforcing plate 30, and a fastening hole 14 for coupling with the decoration member 50. The decoration member 50 may include the decoration cover member 60.

The rear cover 20 may be fixedly coupled with the bottom chassis 10. For this, the rear cover 20 may include the fastening hole 21 for coupling the rear cover 20 with the bottom chassis 10. Also, a through hole 22 for coupling the rear cover 20 with the wall mounting device 100 may be formed. The circuit board 40 may be mounted with various electronic components. The circuit board 40 may be connected with a power wire which transfers external power and an image information wire which transfers external image information.

The circuit board 40 may be fixedly coupled with the bottom chassis 10. For this, the circuit board 40 may include a fastening hole 41 for coupling the circuit board 40 with the bottom chassis 10.

When the wall mounting device 100 is fixedly coupled with the display apparatus 1 using fastening members such as screws or bolts, the reinforcing plate 30 may reinforce a coupling force by allowing the fastening members to be inserted in the reinforcing plate 30.

The reinforcing plate 30 may be fixedly coupled with the bottom chassis 10. For this, the reinforcing plate 30 may include a fastening hole 31 for coupling with the bottom chassis 10. For this, the reinforcing plate 30 may include a fastening hole 32 for coupling with the wall mounting device 100. Here, a fastening member S1 for fixedly coupling the reinforcing plate 30 with the bottom chassis 10 may be provided.

The rear cover 20 may also include a wire through slit 24 provided in the rear cover 20.

Figure 3:
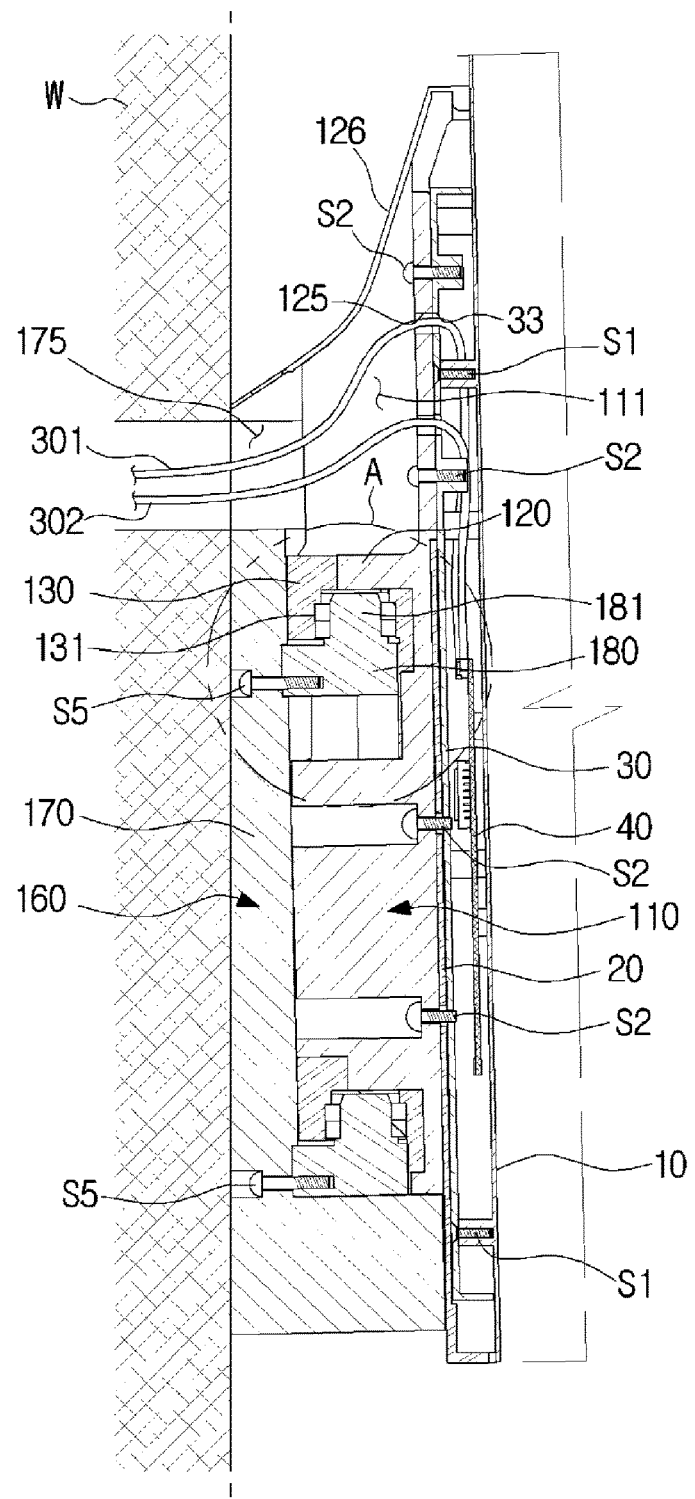
FIG. 3 is a side cross-sectional view illustrating the main components of the display apparatus and the wall mounting device according to an exemplary embodiment.
Figure 4:
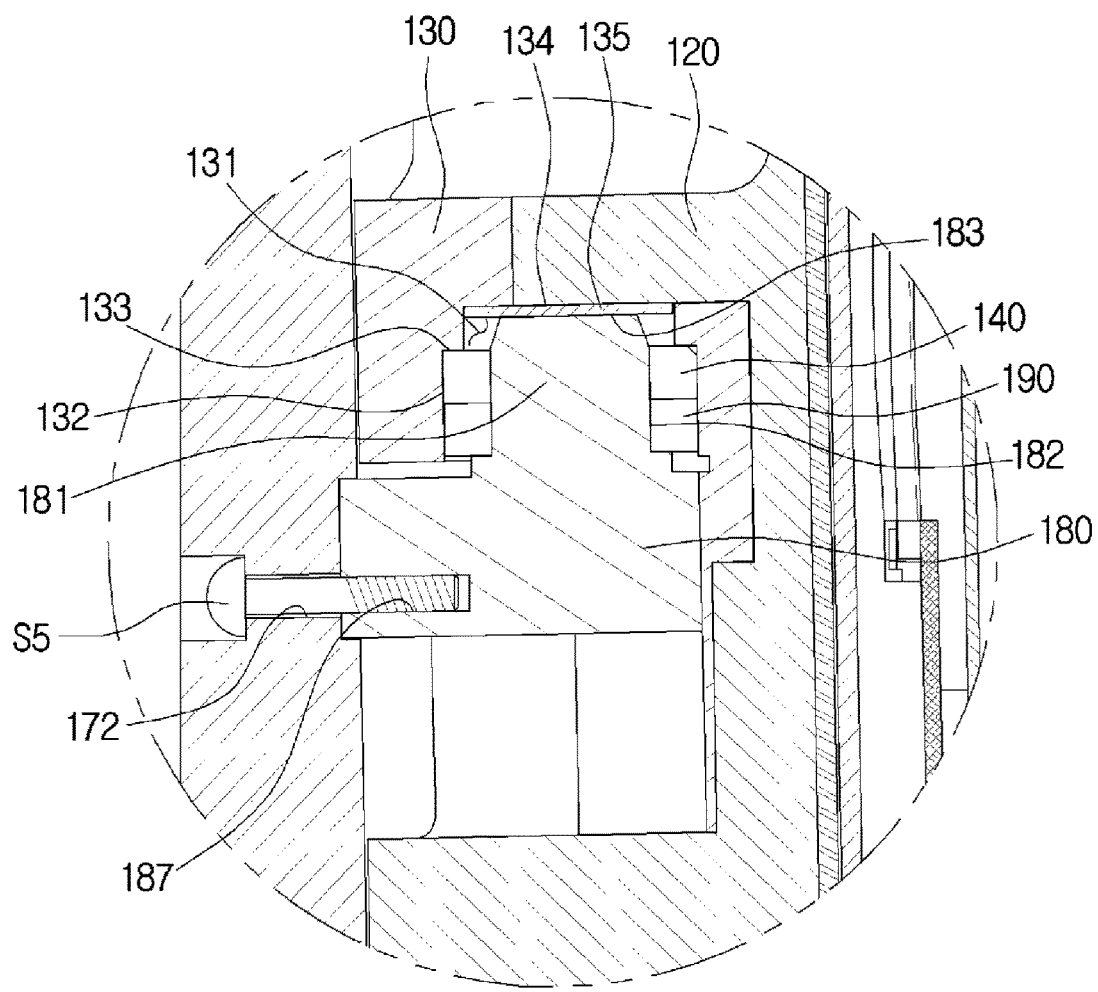
FIG. 4 is an enlarged view illustrating a portion A of FIG. 3.

FIG. 3 is a side cross-sectional view illustrating the main components of the display apparatus 1 and the wall mounting device 100 according to an exemplary embodiment. FIG. 4 is an enlarged view illustrating a portion A of FIG. 3.

Figure 5:
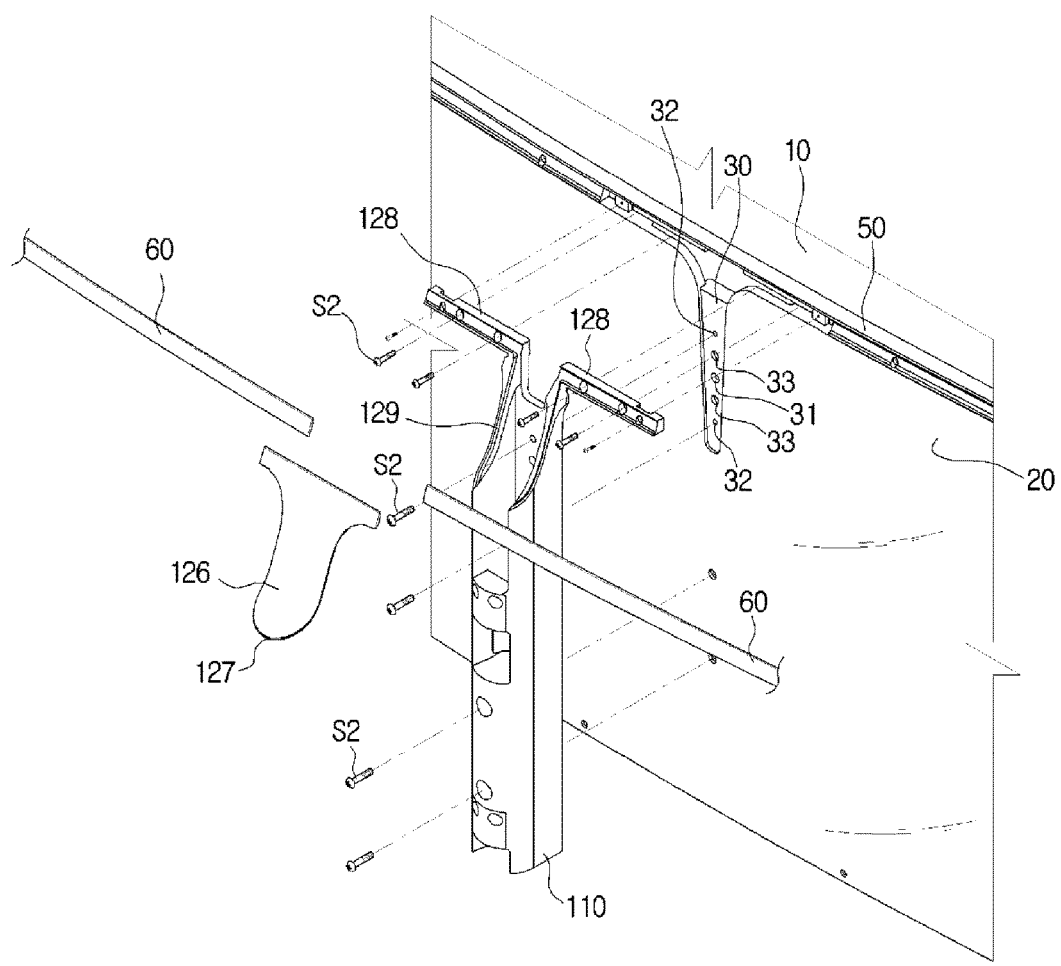
FIG. 5 is a view illustrating a coupling structure of the display apparatus and a display apparatus coupling unit according to an exemplary embodiment.
Figure 6:
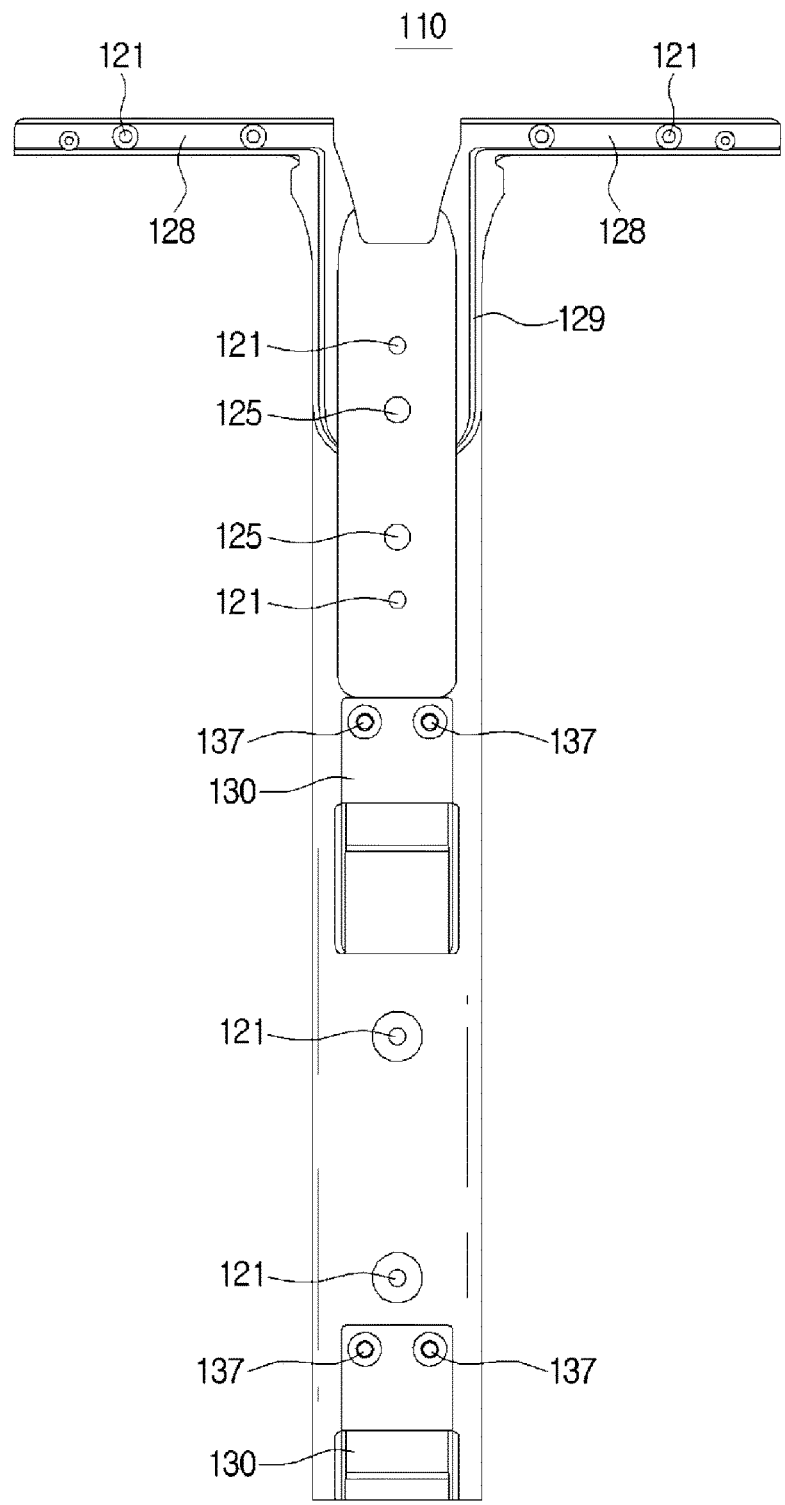
FIG. 6 is a view of the display apparatus coupling unit from which an opening cover is omitted according to an exemplary embodiment.
Figure 7:
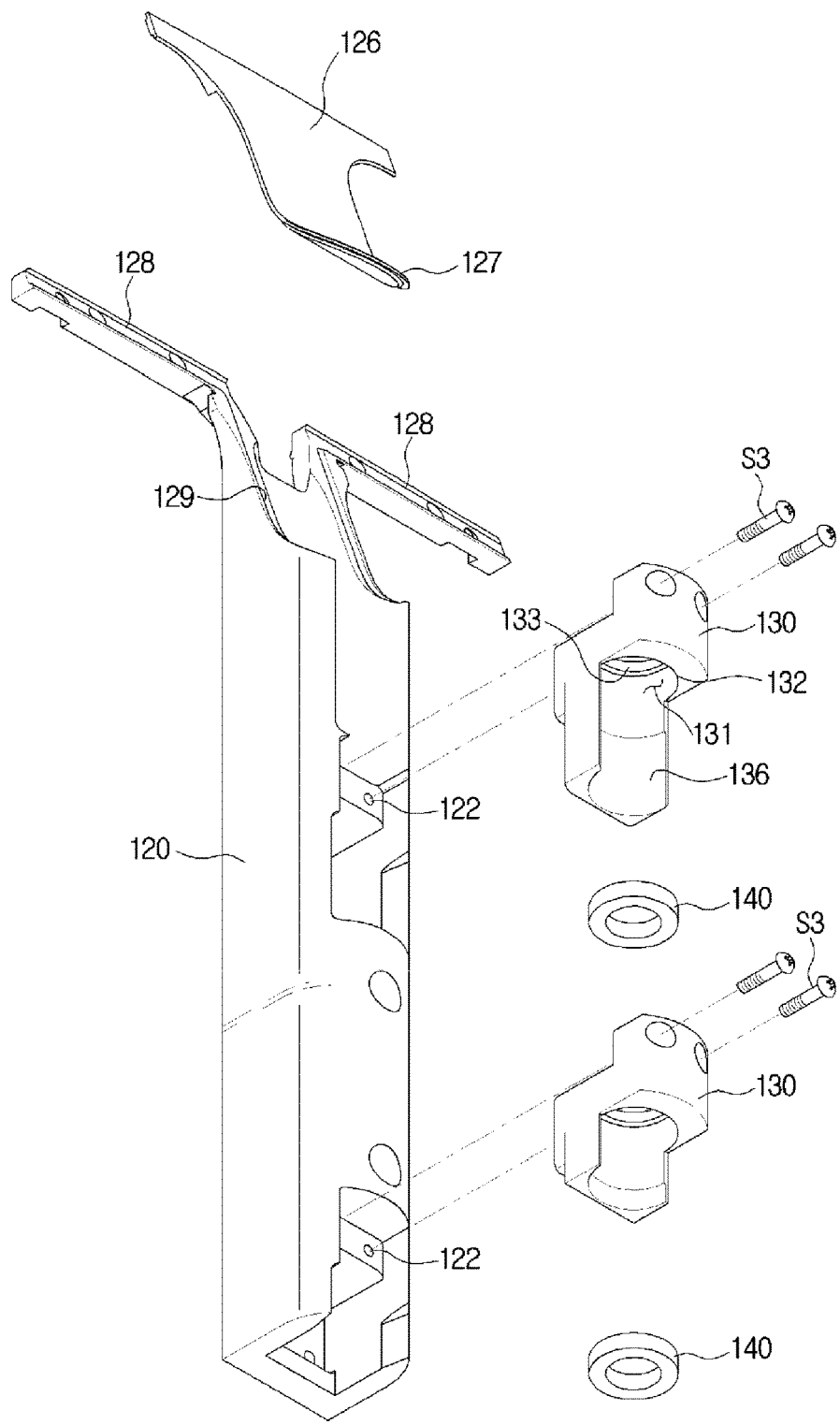
FIG. 7 is an exploded view of the display apparatus coupling unit according to an exemplary embodiment.

FIG. 5 is a view illustrating a coupling structure of the display apparatus 1 and a display apparatus coupling unit 110 according to an exemplary embodiment. FIG. 6 is a view of the display apparatus coupling unit 110 from which an opening cover is omitted according to an exemplary embodiment. FIG. 7 is an exploded view of the display apparatus coupling unit 110 according to an exemplary embodiment.

Referring to FIGS. 3 to 7, the display apparatus coupling unit 110 of the wall mounting device 100 will be described.

The display apparatus coupling unit 110 may be fixedly coupled with a central portion of the rear surface of the display apparatus 1 between the right and left sides thereof in a direction of major axis using fastening members S2 such as screws or bolts. The display apparatus coupling unit 110 may be coupled with a lower portion of the rear surface of the display apparatus 1. The display apparatus coupling unit 110 may include fastening holes 121 (refer to FIG. 6) coupled with the fastening members S2.

The display apparatus coupling unit 110 may include a body 120 (refer to FIG. 7) and a plurality of locking parts 130 provided along a vertical direction of the body 120. Here, the vertical direction indicates a substantially vertical direction.

The locking part 130 may be supported by a supporting section 180 of the wall coupling unit 160 which will be described below. In the exemplary embodiment, there are two locking parts 130 provided along the vertical direction of the body 120. However, the exemplary embodiment is not limited thereto. For example, three or more locking parts 130 may be provided along the vertical direction of the body 120.

The body 120 and the locking part 130 may be separately manufactured and may be fixedly coupled. That is, the body 120 and the locking part 130 may be fixedly coupled using fastening members S3 such as screws or bolts as shown in FIG. 7. For this, the body 120 may include fastening holes 122 and each of the locking parts 130 may include a fastening hole 137.

As described above, because the body 120 and the locking parts 130 are coupled using the fastening members S3, damage or deformation of the locking parts 130 caused by a load thereof may be prevented or minimized by the rigidity of the fastening members S3.

However, the exemplary embodiment is not limited thereto. For example, the body 120 and the locking part 130 may be integrally formed.

The body 120 may have an elongated shape which extends in a vertical direction. The body 120 may have a wing part 128 which extends left and right from a portion of the body 120 extending in the vertical direction. The wing part 128 may extend left and right from a top end of the body 120. The wing part 128 may further balance the load of the display apparatus 1 supported by the body 120.

The locking part 130 includes a pin accommodating section 131, into which a rotating pin 181 provided on the supporting section 180 is inserted and accommodated. The pin accommodating section 131 rotatably supports the rotating pin 181. The pin accommodating section 131 may have an open bottom to allow the rotating pin 181 to advance from the bottom to top to be inserted and to be accommodated in the pin accommodating section 131.

The locking part 130 may have a guide section 136 which guides the rotating pin 181 to the pin accommodating section 131. The guide section 136 may vertically extend to guide the rotating pin 181 into the pin accommodating section 131.

The display apparatus coupling unit 110 may further include bearing members 140 which support an axial load and reduce abrasion between the supporting section 180 and the locking part 130. The bearing member 140 may be press-fitted or welded onto an inner circumferential surface 132 of the pin accommodating section 131. A top of the bearing member 140 may be supported by a lip 133 of an upper portion of the pin accommodating section 131.

The bearing member 140 may be in contact with a bearing member 190 provided on the wall coupling unit 160 which will be described below. The bearing member 190 may distribute a load, and may reduce abrasion caused by rotation.

A top surface 134 of the pin accommodating section 131 may be coupled with a lubricating member 135 (refer to FIG. 4) supported by a top surface 183 of the rotating pin 181. The lubricating member 135 may be formed of a material having stiffness and abrasion resistance.

The display apparatus coupling unit 110 may include a wire guide section which guides wires 301 and 302 (FIG. 3) to be connected to the display apparatus 1.

The wire guide section includes a wire through hole 125 formed in the body 120. In the exemplary embodiment, the body includes one wire through hole 125. However, the exemplary embodiment is not limited thereto. For example, the body 120 may include a plurality of wire through holes. The wire 301 for power may pass through at least one of the plurality of wire through holes 125, and the wire 302 for image information may pass through another of the plurality of wire through holes 125. Here, there is no particular limitation on the number of the wire through holes 125.

A wire path 111 (refer to FIG. 3) may be formed between the display apparatus coupling unit 110 and the wall coupling unit 160.

The display apparatus coupling unit 110 may have an opening 129 for ease of installing wires and coupling the display apparatus coupling unit 110 to the display apparatus 1 and an opening cover 126 for opening and closing the opening 129. The opening cover 126 may be detachably attached to the opening 129 using an adhesive member.

The opening cover 126 has a rotating circular arc section 127 having a circular arc shape, and the rotating circular arc section 127 may be rotatably supported by a rotating guide 176 of the wall coupling unit 160 which will be described below.

Figure 8:
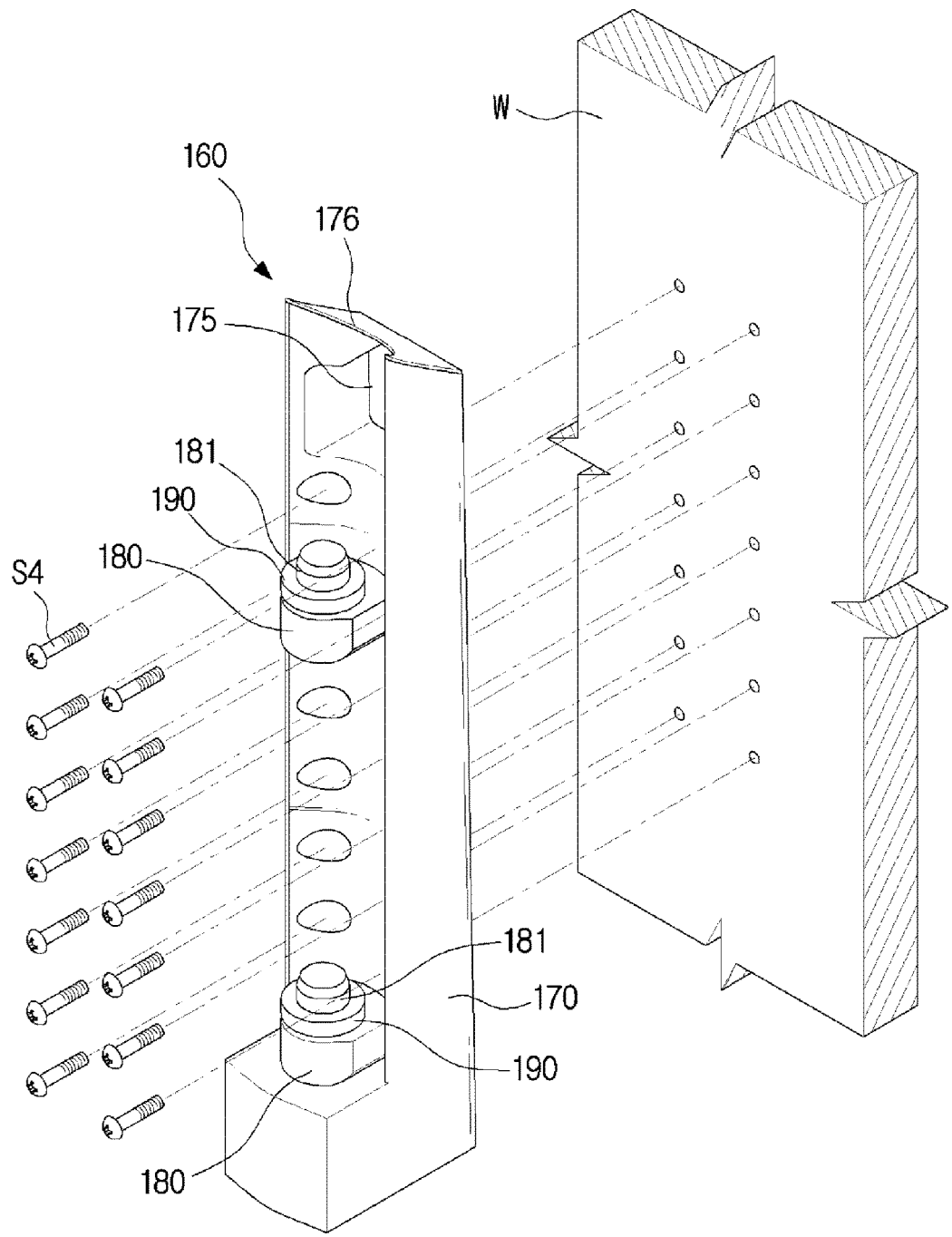
FIG. 8 is a view illustrating a coupling structure of a wall coupling unit and a wall according to an exemplary embodiment.
Figure 9:
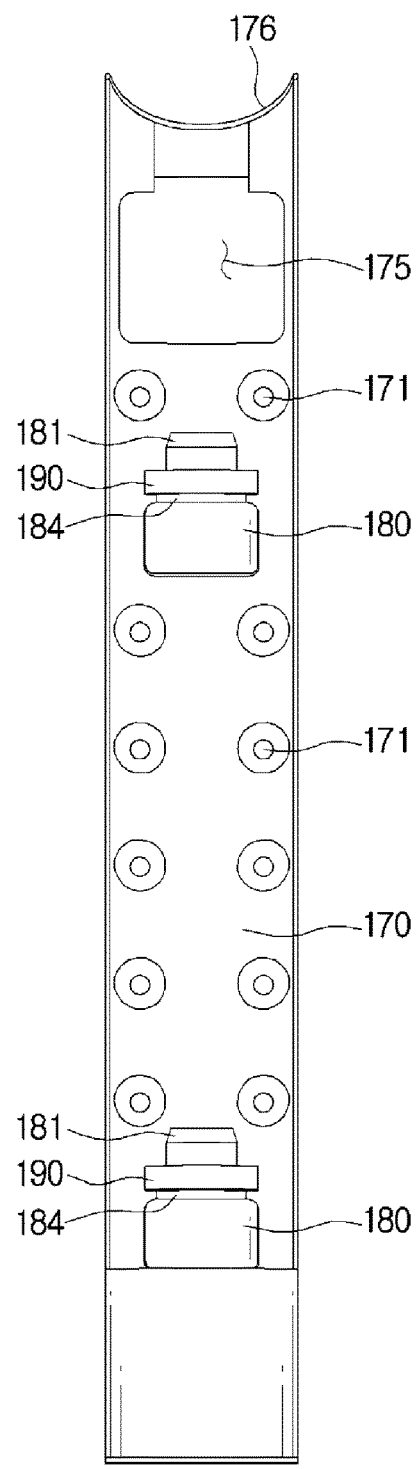
FIG. 9 is a view of the wall coupling unit according to an exemplary embodiment.

FIG. 8 is a perspective view illustrating a coupling structure of the wall coupling unit 160 and a wall W according to an exemplary embodiment. FIG. 9 is a frontal view of the wall coupling unit 160 according to an exemplary embodiment.

Figure 10:
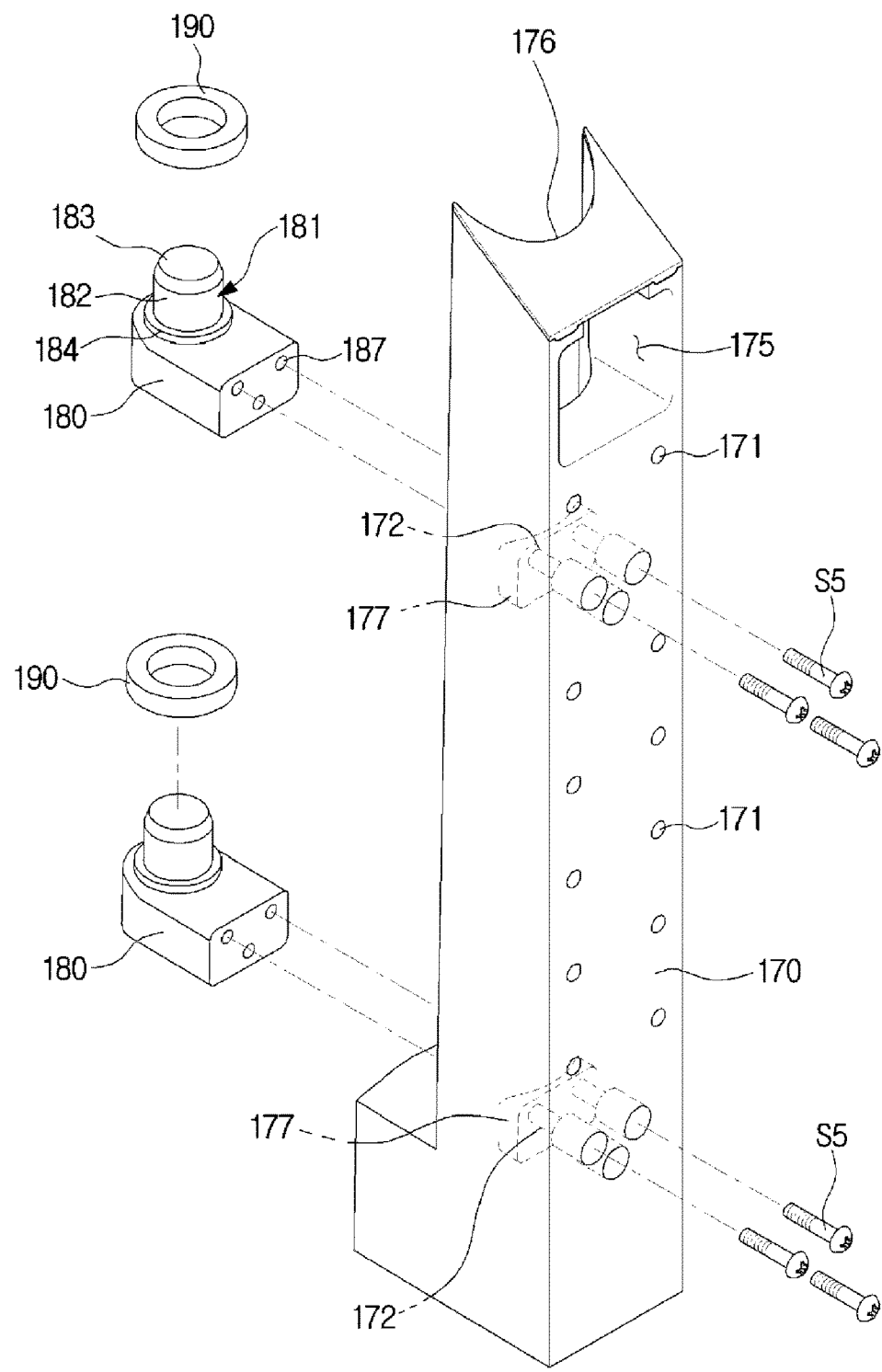
FIG. 10 is an exploded view of the wall coupling unit according to an exemplary embodiment.

FIG. 10 is an exploded view of the wall coupling unit 160 according to an exemplary embodiment.

Referring to FIGS. 3, 4, and 8 through 10, the wall coupling unit 160 of the wall mounting device 100 will be described hereinbelow.

The wall coupling unit 160 may be fixedly coupled with the wall W using a fastening member S4 such as a screw and a bolt. For this, the wall coupling unit 160 may include fastening holes 171 through which the fastening members S4 are fastened.

The wall coupling unit 160 may include a base section 170 and a plurality of supporting sections 180 provided in a vertical direction of the base section 170. Here, the vertical direction indicates a substantially vertical direction. The supporting sections 180 support the locking parts 130 of the display apparatus coupling unit 110.

In the exemplary embodiment, there are provided two supporting sections 180. However, the exemplary embodiment is not limited thereto and, for example, three or more supporting sections 180 may be provided.

The base section 170 and the supporting sections 180 may be separately manufactured and may be fixedly coupled. That is, the base section 170 and the supporting sections 180 may be fixedly coupled using fastening members S5 such as screws or bolts. For this, the base section 170 may include fastening holes 172 and insertion grooves 177. Here, the insertion grooves may accommodate and support ends of the supporting sections 180, respectively, as shown in FIG. 10 and each of the supporting sections 180 may include a fastening hole 187.

As described above, because the base section 170 and the supporting sections 180 are coupled using the fastening members S5, damage or deformation of the supporting sections 180 caused by a load may be prevented or reduced by the rigidity of the fastening members S5.

However, the exemplary embodiment is not limited thereto. For example, the base section 170 and the supporting sections 180 may be integrally formed.

The base section 170 may have an elongated shape which substantially extends in a vertical direction. The supporting section 180 may be provided to protrude from the base section 170 toward the display apparatus coupling unit 110 and the display apparatus 1.

The supporting sections 180 may each have the rotating pin 181 which becomes a center of rotation of the display apparatus 1. The rotating pin 181 vertically protrudes from the supporting section 180. The rotating pin 181 may be inserted and accommodated in the pin accommodating section 131 of the locking part 130. With the components described above, the display apparatus 1 may rotate clockwise or counter-clockwise with respect to an axis extending in a vertical direction. That is, the display apparatus 1 may be able to swivel. Naturally, it is necessary to provide the rotating pin 181 included in the upper portion of the base section 170 and the rotating pin 181 included in the lower portion thereof on the same vertical line.

The top surface 183 of the rotating pin 181 may be in contact with the lubricating member 135 or the top surface 134 of the pin accommodating section 131 to support a load when there is no lubricating member 135.

The wall coupling unit 160 may further include the bearing members 190 which support an axial load and reduces abrasion. The bearing member 190 may be press-fitted or welded onto an outer circumferential surface 182 of the rotating pin 181. A bottom of the bearing member 190 may be supported by a lip 184 of a lower portion of the rotating pin 181.

The bearing member 190 may be in contact with the bearing member 140 provided on the display apparatus coupling unit 110 which has been described above, may distribute a load, and may reduce abrasion caused by rotation.

The wall coupling unit 160 may include a wire guide section which guides the wires 301 and 302 connected to the display apparatus 1.

The wire guide section includes a wire through hole 175 formed in the base section 170.

The wires 301 and 302 may sequentially pass through a wire through hole 33 of the reinforcing plate 30, the wire through slit 24 of the rear cover 20, the wire through hole 125 of the display apparatus coupling unit 110, the wire path 111 formed between the display apparatus coupling unit 110 and the wall coupling unit 160, and the wire through hole 175 of the wall coupling unit 160 and may electrically connect the circuit board 40 with external components.

Figure 11:
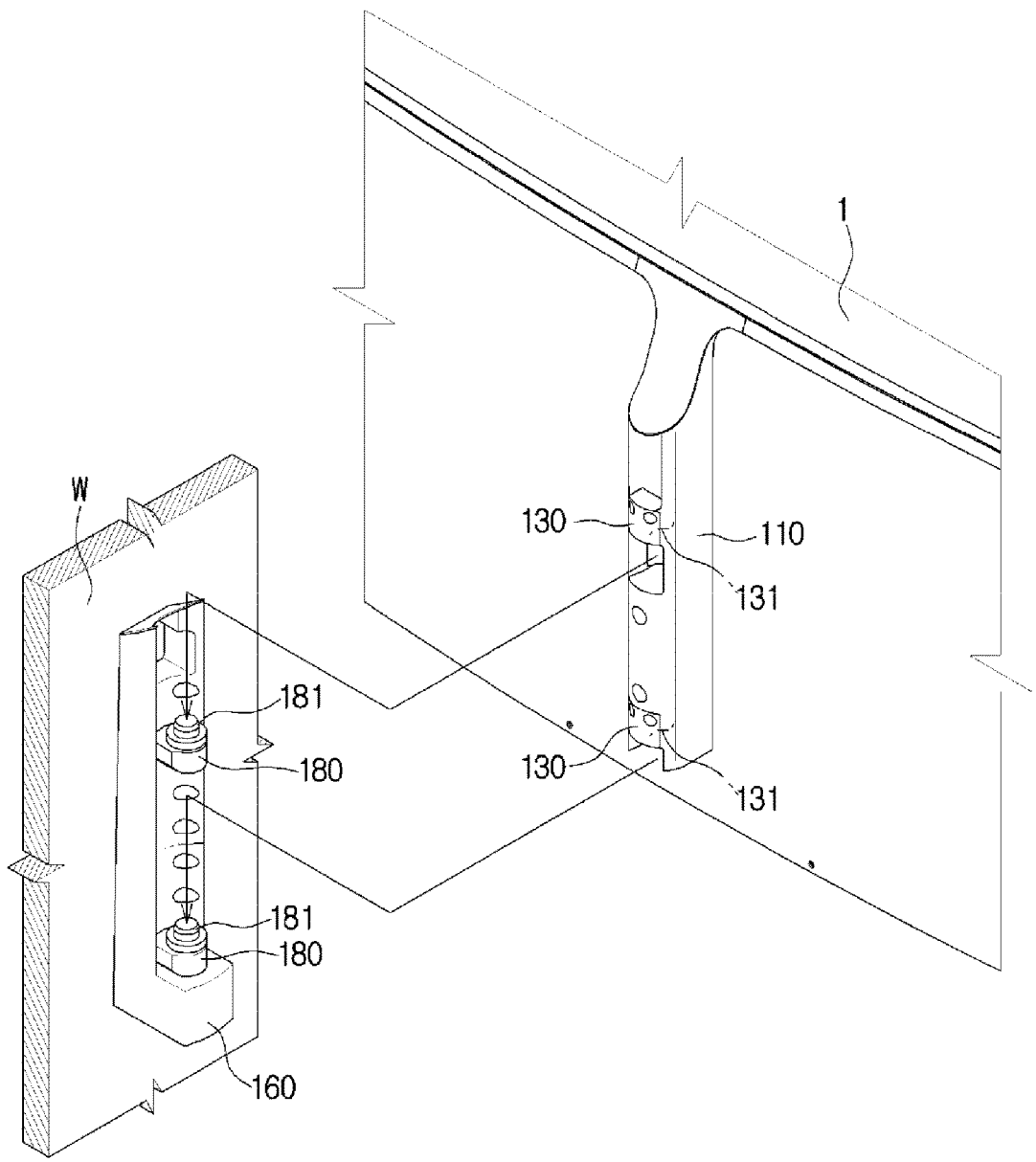
FIG. 11 is a view illustrating a mounting and separation structure of the display apparatus coupling unit and the wall coupling unit according to an exemplary embodiment.
Figure 12:
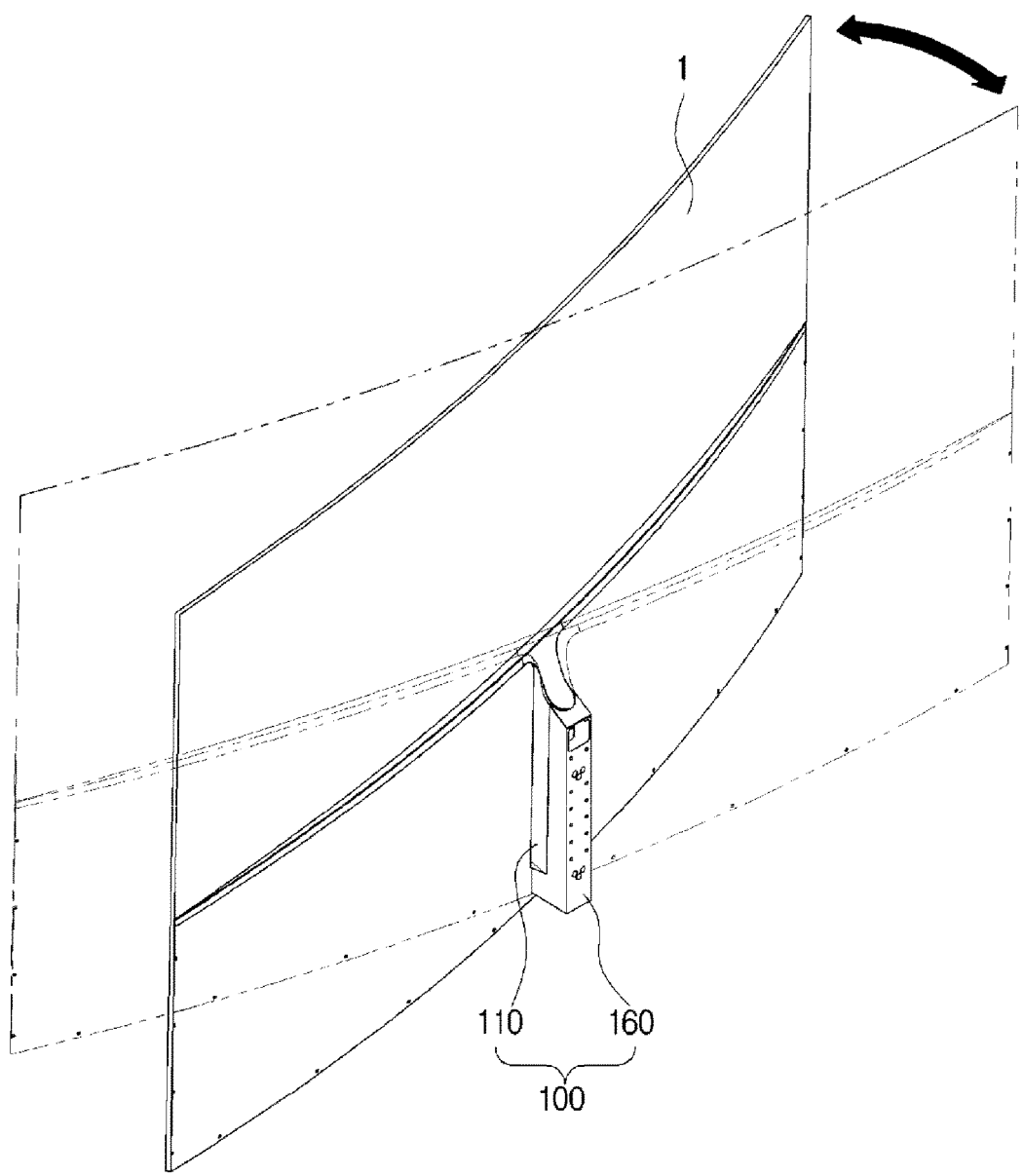
FIG. 12 is a view illustrating a swivel operation of the display apparatus according to an exemplary embodiment.
Figure 13:
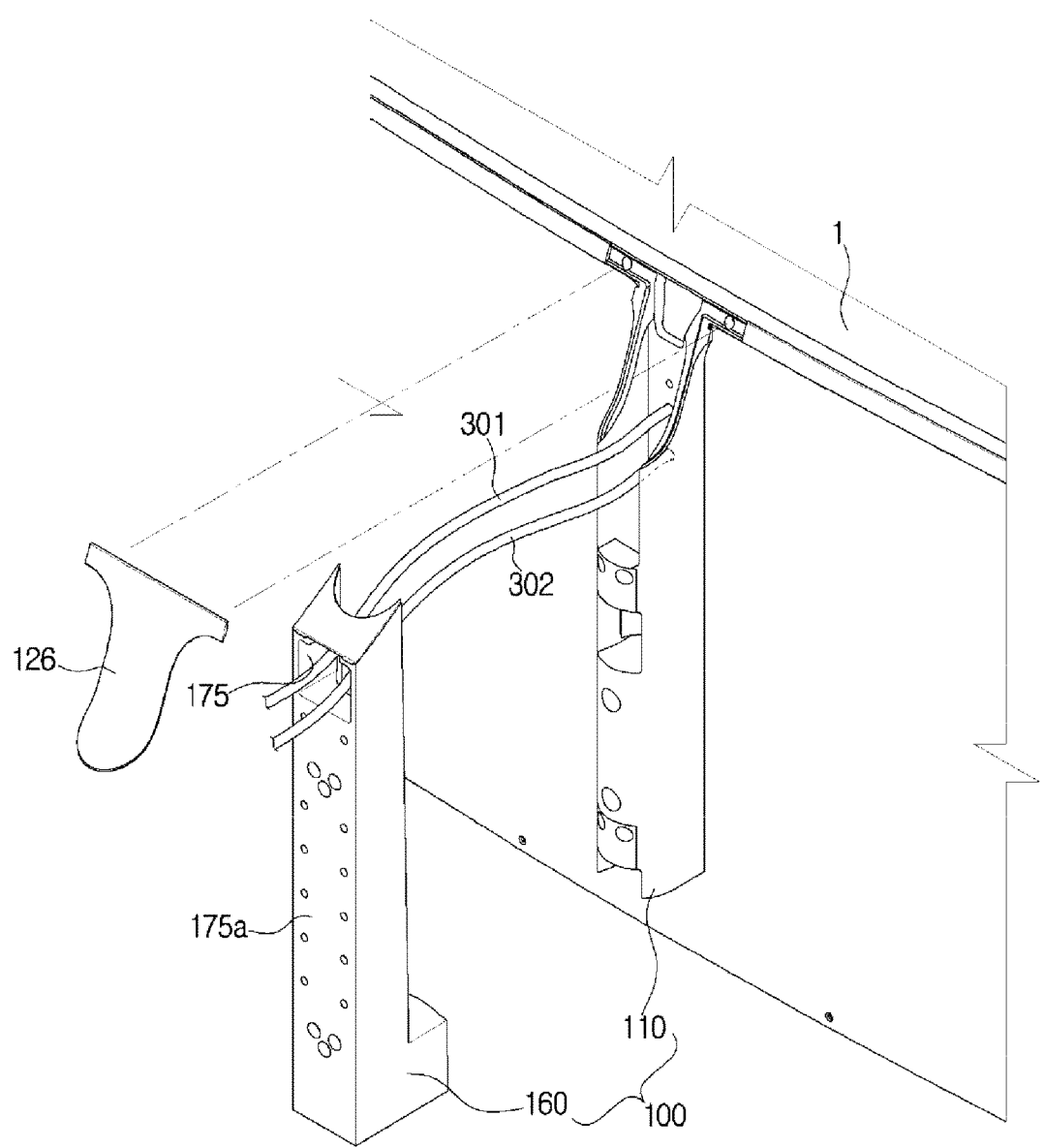
FIG. 13 is a view of a wire guide section of the wall mounting device according to an exemplary embodiment.

FIG. 11 is a view illustrating a mounting and separation structure of the display apparatus coupling unit 110 and the wall coupling unit 160 according to an exemplary embodiment. FIG. 12 is a view illustrating a swivel operation of the display apparatus 1 according to an exemplary embodiment. FIG. 13 is a view of a wire guide section of the wall mounting device 100 according to an exemplary embodiment.

Referring to FIGS. 11 to 13, the installation and operation of the wall mounting device 100 will be described.

As shown in FIG. 11, the display apparatus coupling unit 110 is fixedly coupled with the rear surface of the display apparatus 1, the wall coupling unit 160 is fixedly coupled with the wall W, and the locking part 130 of the display apparatus coupling unit 110 is mounted on the supporting section 180 of the wall coupling unit 160, thereby mounting the display apparatus 1 on the wall W.

Here, the rotating pin 181 of the supporting section 180 is rotatably inserted into the pin accommodating section 131 of the locking part 130. Accordingly, as shown in FIG. 12, the display apparatus 1 may be rotatable in a clockwise direction and a counter-clockwise direction with respect to a vertical axis.

The display apparatus coupling unit 110 may be coupled with and supported by the wall coupling unit 160 while being mounted on the wall coupling unit 160 to allow the rotating pin 181 to be inserted in the pin accommodating section 131. Alternatively, the display apparatus coupling unit 110 may be separated from the wall coupling unit 160 only by lifting the display apparatus 1 to disengage the rotating pin from the pin accommodating section 131.

As shown in FIG. 13, the wires 301 and 302 may pass through the wall mounting device 100 and may electrically connect the circuit board 40 inside the display apparatus 1 with external components.

The wires 301 and 302 may be guided outward through the wire through hole 175 formed in a rear wall 175a of the wall coupling unit 160. Accordingly, the wires 301 and 302 may be guided into the wall while being not exposed to the outside.

Figure 14:
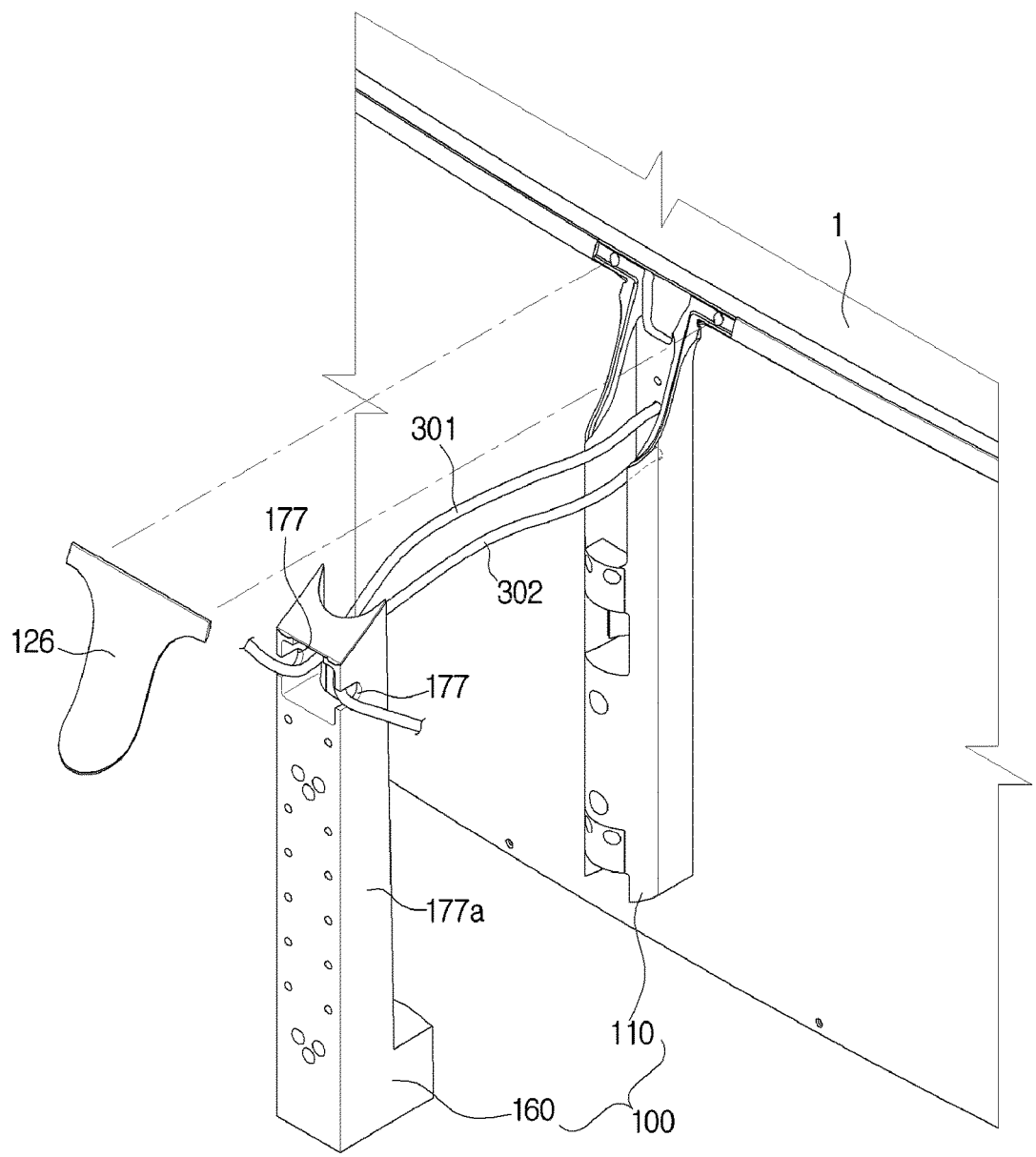
FIG. 14 is a view of a wire guide section of the wall mounting device according to an exemplary embodiment.
Figure 15:
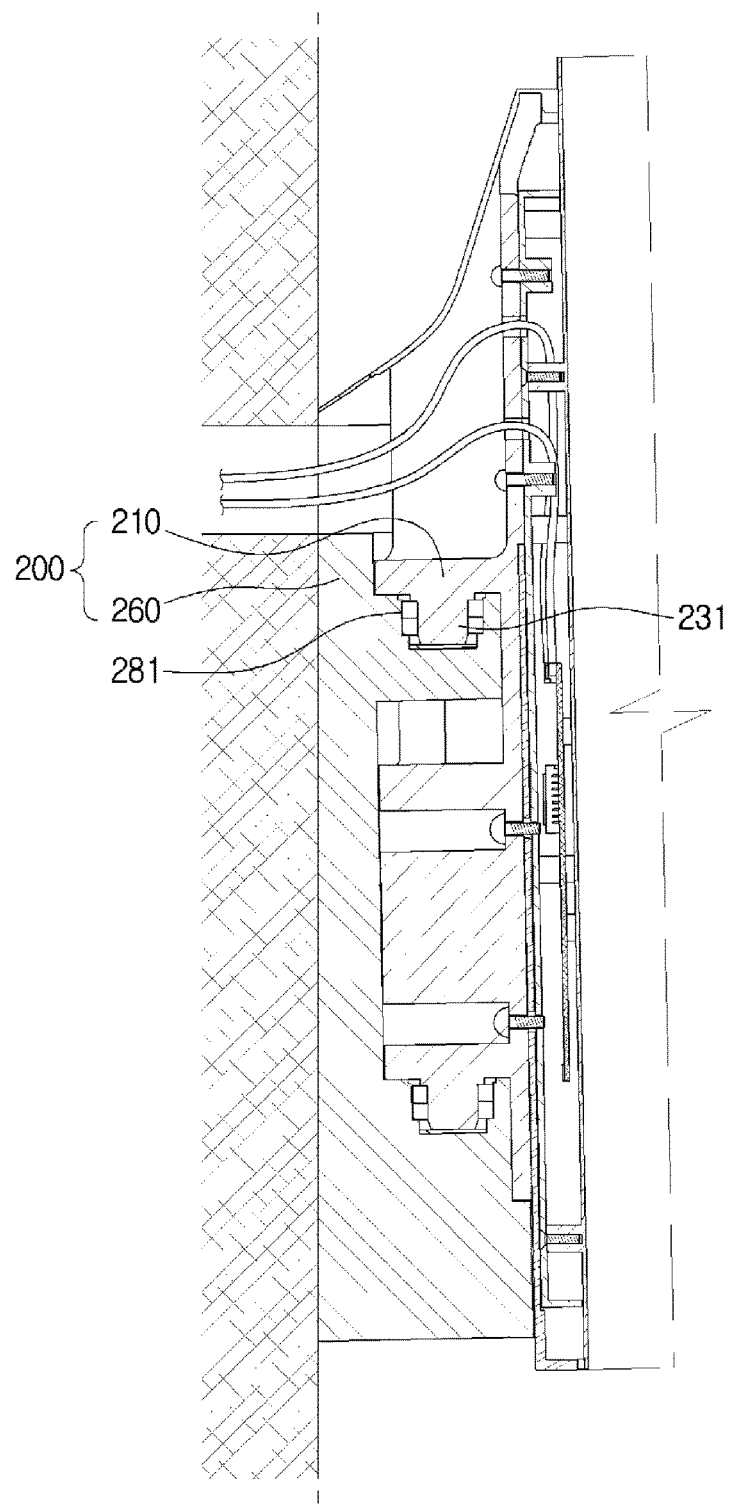
FIG. 15 is a cross-sectional view of a wall mounting device according to still an exemplary embodiment.

FIG. 14 is a view of a wire guide section of the wall mounting device 100 according to an exemplary embodiment. FIG. 15 is a cross-sectional view of a wall mounting device 200 according to still an exemplary embodiment.

Hereinafter, a description of the same components as the described above will be omitted.

As shown in FIG. 14, a wire through hole 177 may be formed in a sidewall 177a of the wall coupling unit 160. With this structure, the wires 301 and 302 may be guided to the inside of the room instead of to the inside of a wall.

As shown in FIG. 15, contrary to the above-described embodiment, a rotating pin 231 may be provided on a display apparatus coupling unit 210 of the wall mounting device 200 and a pin accommodating section 281 which rotatably accommodates the rotating pin 231 may be provided on a wall coupling unit 260.

As is apparent from the above description, the wall mounting device in accordance with an exemplary embodiment may have a smaller thickness. Accordingly, a display apparatus can be disposed to be attached closer to a wall, thereby providing an increase in availability of space and aesthetic.

The swiveling of the display apparatus can be enabled by the support of wall mounting device.

A neat and easy arrangement of the wires can be provided by the guiding of the wires connected to the display apparatus by the wall mounting device.

Although exemplary embodiments have been particularly shown and described above, it would be appreciated by those skilled in the art that various changes may be made in these embodiments without departing from the principles and spirit of the inventive concept, the scope of which is defined by the following claims.

What is claimed is:

1. A wall mounting device for mounting a display apparatus on a wall, the wall mounting device comprising:
   a display apparatus coupling unit comprising an elongated body configured to be coupled at a central portion of a width of the display apparatus along a height direction of the display apparatus and a plurality of locking parts arranged in the height direction of the display apparatus, the elongated body having a wing part at a distal end of the elongated body extending left and right in the width direction of the display apparatus from the elongated body to balance the load of the display apparatus supported by the elongated body; and
   a wall coupling unit configured to be coupled with the wall and comprising a plurality of supporting sections arranged along the height direction configured to support the plurality of locking parts.

2. The wall mounting device of claim 1, wherein the display apparatus coupling unit is configured to rotate in a clockwise direction and a counter-clockwise direction relative to the wall coupling unit.

3. The wall mounting device of claim 1, wherein the display apparatus coupling unit is coupled with a lower portion of the display apparatus along the height direction of the display apparatus.

4. The wall mounting device of claim 1, wherein the display apparatus coupling unit and the wall coupling unit are detachably coupled to each other.

5. The wall mounting device of claim 1, wherein each of the plurality of supporting sections comprises a rotating pin protruding in the height direction of the display apparatus, the display apparatus configured to rotate with respect to the rotating pin, and
   wherein each of the plurality of locking parts comprises a pin accommodating section into which the rotating pin is rotatably accommodated.

6. The wall mounting device of claim 1, wherein each of the plurality of locking parts comprises a rotating pin protruding in the height direction of the display apparatus, the display apparatus configured to rotate with respect to the rotating pin, and
   wherein each of the plurality of supporting sections comprises a pin accommodating section into which the rotating pin is rotatably accommodated.

7. The wall mounting device of claim 1, further comprising a bearing member configured to support an axial load between the display apparatus coupling unit and the wall coupling unit.

8. The wall mounting device of claim 7, wherein the bearing member comprises:
   an upper bearing member coupled with a locking part of the plurality of locking parts; and
   a lower bearing member coupled with a supporting section of the plurality of supporting sections.

9. The wall mounting device of claim 1 further comprising a wire guide section configured to guide a wire to be connected to the display apparatus.

10. A wall mounting device for mounting a display apparatus on a wall, the wall mounting device comprising:
   a display apparatus coupling unit configured to be coupled with a rear surface of the display apparatus, the display apparatus coupling unit comprising:
      an elongated body configured to be coupled at a central portion of a width of the display apparatus along a height direction of the display apparatus and a plurality of locking parts arranged in the height direction of the display apparatus, the elongated body having a wing part at a distal end of the elongated body extending left and right in the width direction of the display apparatus from the elongated body to balance the load of the display apparatus supported by the elongated body; and
   a wall coupling unit configured to be coupled with the wall and configured to support the display apparatus coupling unit, wherein the wall coupling unit comprises:
      a rear wall configured to abut the wall when the wall coupling unit is coupled with the wall; and a wire guide section configured to guide a wire to be connected to the display apparatus, the wire guide section comprising a wire through hole in the rear wall.

11. The wall mounting device of claim 10, wherein the display apparatus coupling unit comprises a wire guide section configured to guide the wire to be connected to the display apparatus, and the wire guide section of the display apparatus coupling unit comprises a wire through hole formed in the display apparatus coupling unit.

12. The wall mounting device of claim 10, wherein the wall coupling unit further comprises:
a first sidewall extending from a first distal end of the rear wall in a direction away from the wall and perpendicular to the rear wall; and
a second sidewall extending from a second distal end of the rear wall in the direction away from the wall and perpendicular to the rear wall, and
wherein the wire guide section further comprises a wire through hole formed in at least one of the first sidewall of the wall coupling unit and the second sidewall of the wall coupling unit.

13. The wall mounting device of claim 10, wherein the wire guide section further comprises a wire path formed between the display apparatus coupling unit and the wall coupling unit.

14. A wall mounting device for mounting a display apparatus on a wall, the wall mounting device comprising:
a first unit configured to be coupled at a central portion of a width of the display apparatus along a height direction of the display apparatus, the first unit comprising:
an elongated body having an elongated shape in a height direction of the display apparatus; and
a plurality of locking parts provided on the elongated body and arranged in the height direction of the display apparatus; and
a second unit configured to be coupled with the wall and comprising:
a base section having an elongated shape corresponding to the elongated body; and
a plurality of supporting sections provided on the base section and arranged in the height direction of the display apparatus to support the plurality of locking parts,
wherein the first unit further comprises a wing part at a distal end of the elongated body protruding left and right from the elongated body, the wing part configured to balance the load of the display apparatus supported by the elongated body.

15. The display apparatus of claim 14, wherein the elongated body and the plurality of locking parts are integrally formed.

16. The display apparatus of claim 14, wherein the elongated body and the plurality of locking parts are attached to each other using a fastening member.

17. The display apparatus of claim 14, wherein the base section and the plurality of supporting sections are integrally formed.

18. The display apparatus of claim 14, wherein the base section and the plurality of supporting sections are attached to each other using a fastening member.

* * * * *